United States Patent [19]

Lohberg

[11] Patent Number: 4,828,332
[45] Date of Patent: May 9, 1989

[54] BRAKE SYSTEM WITH ANTI SKID CONTROL AND/OR TRACTION SLIP CONTROL

[75] Inventor: Peter Lohberg, Friedrichsdorf, Fed. Rep. of Germany

[73] Assignee: Alfred Teves GmbH, Frankfurt am Main, Fed. Rep. of Germany

[21] Appl. No.: 163,445

[22] Filed: Mar. 3, 1988

[30] Foreign Application Priority Data

Mar. 6, 1987 [DE] Fed. Rep. of Germany ....... 3707157

[51] Int. Cl.$^4$ ............................ B60T 8/86; B60T 8/44
[52] U.S. Cl. ...................................... 303/93; 303/9.61; 303/100; 303/114; 60/545; 60/568; 60/581
[58] Field of Search .................. 303/6.01, 9.61, 50, 303/93, 100, 113, 114, 116, 119, 61; 183/181 R, 356–360; 60/533, 541, 545, 547.1, 568, 581

[56] References Cited

U.S. PATENT DOCUMENTS

| 2,867,307 | 1/1959 | Ingres | 60/545 X |
| 2,918,041 | 12/1959 | Stelzer et al. | 188/357 |
| 3,979,153 | 8/1975 | Ingram et al. | 60/581 X |
| 4,576,417 | 3/1986 | Dobner | 303/100 X |
| 3,5787,820 | 8/1971 | Riordan | 303/114 |

FOREIGN PATENT DOCUMENTS

| 0130501 | 9/1985 | European Pat. Off. |
| 1473729 | 5/1977 | United Kingdom . |
| 1511254 | 5/1978 | United Kingdom . |
| 2011563 | 7/1979 | United Kingdom .............. 60/545 |
| 2136899 | 9/1984 | United Kingdom . |
| 2139722 | 11/1984 | United Kingdom . |
| 2162605 | 2/1986 | United Kingdom . |
| 2169369 | 7/1986 | United Kingdom . |

Primary Examiner—Andres Kashnikow
Assistant Examiner—Timothy Newholm
Attorney, Agent, or Firm—James B. Raden

[57] ABSTRACT

A brake system with anti-skid control and/or traction slip control is disclosed. This system includes a pedal-operated braking pressure generator and an auxiliary-force-generating system connected between the brake pedal and the braking pressure generator for generating auxiliary forces for assisting the pedal force or for generating an opposed force dependent on the brake pedal travel, the rotational behavior of the wheels and on predetermined control patterns. Control elements in the form of electric linear motors or hydraulically or vacuum-driven servomotors are used for generating the auxiliary forces.

11 Claims, 3 Drawing Sheets

BRAKE SYSTEM WITH ANTI SKID CONTROL AND/OR TRACTION SLIP CONTROL

BACKGROUND OF THE INVENTION

This invention relates to a brake system having anti-skid control and/or traction slip control including a pedal-operated braking pressure generator and an auxiliary-force-generating system by means of which controllable auxiliary forces can be produced which either assist or oppose the pedal force. Wheel sensors and electronic circuits are provided for detecting the rotational behavior of the wheels and for generating auxiliary force control signals.

An anti-skid-controlled brake system of this type is disclosed in the German Published Patent Application No. DE-OS 33 17 629 (Corresponding to U.S. Pat. No. 4,702,531). That system includes a master cylinder with a servo arrangement connected upstream. By metering in a vacuum or auxiliary hydraulic pressure, an auxiliary force is generated by the arrangement. The auxiliary force either assists or opposes the pedal actuating force. Moreover, multi-directional valves are inserted into the pressure medium lines leading from the master cylinder to the wheel brakes, which multi-directional valves can be changed over to lock. If the associated electronics detect a lock-up tendency at one or more wheels, the master cylinder pressure, and thus the braking pressure, is reduced due to the build-up of an auxiliary force opposed to the pedal force. The pressure build-up becomes effective only at the wheels that have become instable. At the same time, due to locking of the pressure medium paths leading to the remaining wheels, the pressure medium is enclosed therein and thus the braking pressure is kept constant. By means of the multi-directional valves, the individual wheel brakes are consecutively connected to the master cylinder each time the auxiliary force is varied so such as to ensure that the desired pressure level will be established in the connected wheel.

SUMMARY OF THE INVENTION

It is an object of this invention to provide for a brake system of this type so as to achieve a reduction in its cost, without compromising, and preferably improving, the operational reliability of the system. A further object is to provide for braking in adverse situations, such as in case of failure of the auxiliary energy where braking should still be possible with an acceptable pedal force. Further, such a brake system should also be able to control traction slip.

These objects are acheived in a surprisingly simple and technically advanced manner by a further development of the brake system of the type referred to above according to the invention wherein auxillary-force-generating system is connected between the brake pedal and the braking pressure generator and the auxiliary forces are controllable in dependence on the brake pedal travel, the rotational behavior of the wheels and/or on predetermined control patterns.

According to an advantageous embodiment of this invention, the auxiliary-force-generating system includes one or more electronically and/or electrically and directly or indirectly controllable control elements for assisting the brake actuating force and control elements for limiting the brake pedal travel and/or for generating the auxiliary force component opposed to the brake pedal. The brake pedal, and braking pressure generator, and the control elements of the auxiliary-force-generating system advantageously are connected with each other by way of compression and/or tension-transmitting elements such as rods and/or Bowden-type cables.

One or several traditional-type master cylinders with a vacuum booster connected upstream can be provided as the braking pressure generator. In this case it is ensured that there will be braking with boosted action even in the event of trouble or failure of the auxiliary energy supply to the auxiliary force generators.

According to the invention, servomotors are provided as control elements, which motors are driven electrically, hydraulically or pneumatically and preferably by a vacuum. Such motors can be manufactured at little expense and work very reliably.

The auxiliary-force-generating system of the inventive brake system generally includes two or more servomotors. One motor generates an auxiliary force component which can be superimposed on the pedal force and another motor has the effect of supporting, locking or resetting the pedal. Depending on the braking situation, the control elements co-operate in different ways with one another and are controlled by a microcomputer.

BRIEF DESCRIPTION OF THE DRAWING

Further characteristics, advantages, and applications of the invention will become evident from the following Detailed Description of the Preferred Embodiment of the Invention, reference being made to the accompanying drawings in which.

DETAILED DESCRIPTION OF A PREFERRED EMBODIMENT

Figure 1:
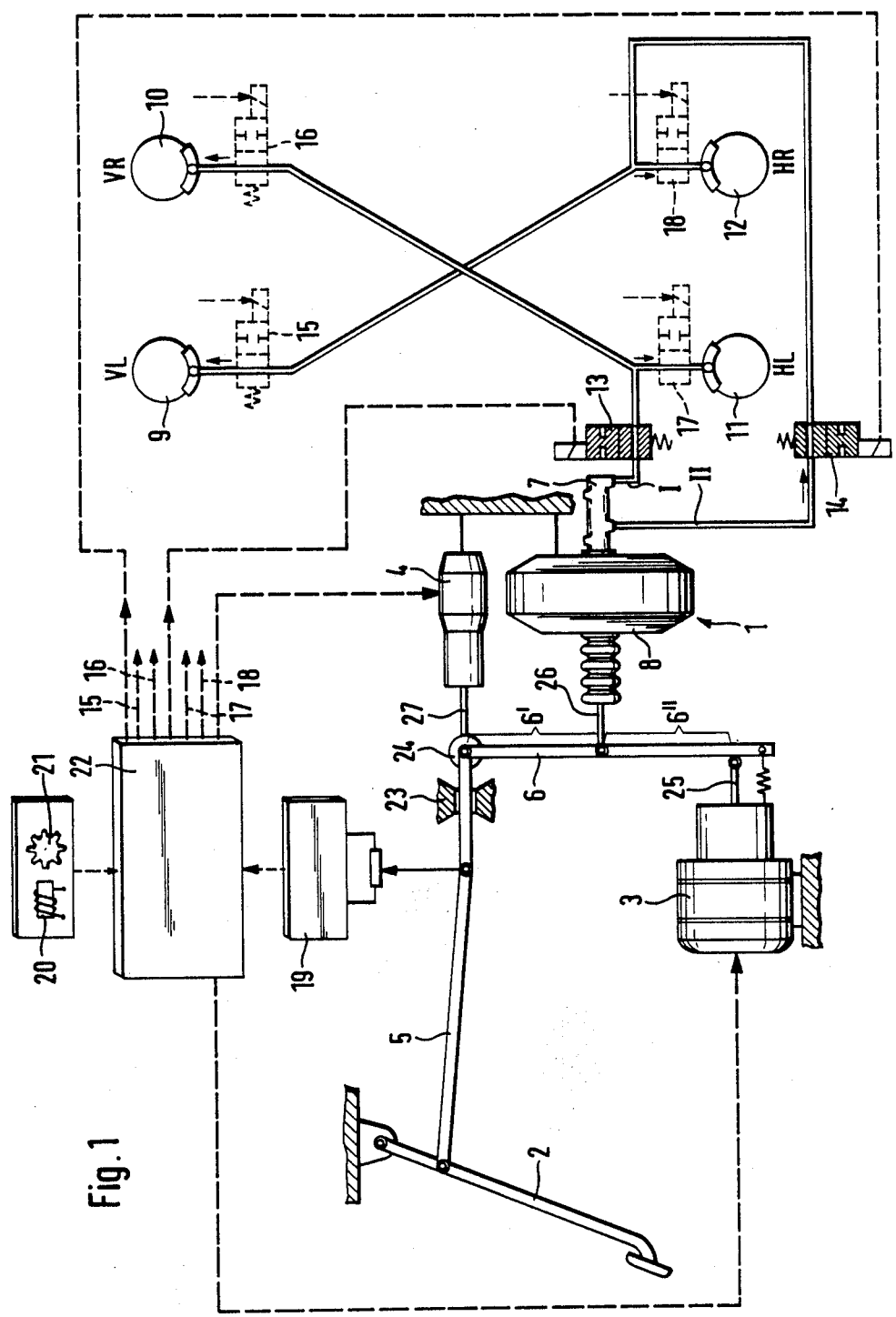
FIG. 1 is a block diagram showing the interconnection of the components of a brake system acccording to the invention including the electromechanical auxiliary-force-generating system.

According to the embodiment illustrated in FIG. 1, the brake system essentially comprises of a braking pressure generator 1 actuated through a brake pedal 2, an auxiliary-force-generating system including two control elements 3, 4 of different design and a lever arrangement 5, 6 by means of which the brake pedal 2, the braking pressure generator 1 and the control elements 3, 4 are operatively connected together. The braking pressure generator 1 is made up of a tandem master cylinder 7 with a vacuum booster 8 connected upstream. The wheel brakes 9, 10, 11, 12 of an automotive vehicle are diagonally connected to two hydraulically separate brake circuits I, II of the master cylinder 7. The reference numerals 9, 10 designate the brakes of the front wheels VR, VL and the reference numerals 11, 12 designate the brakes of the rear wheels HR, HL. Further, electromagnetically operated change-over multi-directional valves 13, 14, 15, 16, 17, 18, in the form of 2/2 way valves, are inserted into the pressure medium lines leading to the wheel brakes. In their normal position the multi-directional valves are switched for providing passage of fluid. It is possible to lock and isolate the pressure medium between the brake and valve by means of the valves. That is, after changing-over of the valves, the pressure will remain constant in the respective circuit or in the respective wheel brake even if the pressure in the master cylinder 7 or in the brake circuits just then connected to the brake is reduced or increased for the purpose of providing anti-skid control or traction slip control.

Further, the inventive brake system includes wheel sensors for detecting the rotational behavior of the individual wheels. Also provided is a device 19 for measuring the pedal travel, as well as electronic circuits for evaluating the measured values and for generating auxiliary force control signals and braking pressure control signals. The individual wheel sensors, for example inductive transducers 20 are arranged at the periphery of a toothed disk 21 rotating with the associated vehicle's wheels VL, VR, HL, HR. This wheel sensor, or any other such sensor arrangement, is provided at each of the vehicle's wheels. In the drawings, the wheel sensors provide the information relating to the rotational behavior of the wheels to the electronic circuits which are illustrated by symbols, only. A microcomputer 22 processes the electric signals supplied thereto by a travel measuring device 19 and by the wheel sensors 20, 21 and generates and sends electric control signals to the control elements 3, 4 and to the multi-directional valves 13, 14, 15, 16, 17 and 18 over the signal lines illustrated by broken lines in the drawings.

In the embodiment shown the lever arrangement connecting the brake pedal 2 with the braking pressure generator 1 and with the control elements 3, 4 includes a push rod 5 axially displaceably guided in a bearing 23 and a lever 6 hinged to the rod 5. The hinge is marked by the reference numeral 24. The distal end of the lever 6 rests on the head of the driving shaft 25 of the control element 3. A push rod 26, by way of which the braking pressure generator 1 is actuated, is hinged to the lever 6 so that there are formed two power arms 6', 6" of equal length. Upon actuation of the pedal 2, the push rod 26, at the entry of the braking pressure generator 1, will travel one-half the distance axially displaced by the push rod 5 so long as the driving shaft 25 of the control element 3 is locked against movement.

The illustrated brake system operates as follows:

During "normal" braking operations when there is neither anti-skid control nor traction slip control, the control element 4, that is the counteracting motor, will permit an almost unhindered displacement of its push rod 27. The axial displacement of the push rod 5 will be registered by the travel measuring device 19. Corresponding electric control signals will be generated in the microcomputer 22. The control signals will cause the control element 3, which is the embodiment shown is an electric linear motor, to displace the driving shaft 25 in parallel with the push rod 5 by the same amount. Consequently, the lever 6 will be displaced axially parallel, that is without tilting, by the pedal force and the auxiliary force. In this example, the cumulative force acting on the push rod 26 of the braking pressure generator 1 will be generated in equal portions by the pedal force and by the auxiliary force generated by the control element 3. The force exerted on the push rod 26 will be transmitted in the usual way, boosted by the servo system or the vacuum booster 8, to the master cylinder 7 and will thus be passed on to the wheel brakes by way of the brake circuits I, II. The multi-directional valves 13, 14, 15, 16, 17 and 18 will remain open, thus not having any influence on this uncontrolled braking operation.

In case of trouble, such as in case of a power failure, the control element 3 will become inoperative. Upon an application of the pedal, the lever 6 will be supported on the head of the driving shaft 25. The control element 3 will be pushed back into its initial position. Thereafter the control element 3 will form an abutment for the lower, distal, end of the lever 6. The brake will remain fully operative while, however, requiring a lengthened pedal travel which in the illustrated embodiment will be about twice as long as that under normal conditions.

According to the invention, the auxiliary-force-generating system provides for building up a certain desired foot-pressure-to-pedal-travel characteristic through suitable actuation of the control element, or counteracting motor 4, to provide the driver with proper pedal feel. Further, by means of the microcomputer 22, it is possible to provide a program-controlled braking-force-to-pedal-travel characteristic to the selected foot-pressure-to-pedal-travel characteristic. To this end, the force applied opposed to the pedal force, as generated by the counteracting motor 4, and the auxiliary force superimposed on the pedal force, as generated by the control element 3, are predetermined in a certain way by means of corresponding programming of the microcomputer 22.

It is also possible to provide for changing over to various different programs initially programmed into the microcomputer 22 in order to adapt the brake's characteristic to varying road conditions encountered in the summertime and in the wintertime. Different programs for dry, rainy, snowy weather, etc. which can be preselected by the driver merely pressing a button are contemplated.

Modulation of the brake pressure for controlling the rotational behavior of the wheels in case of an imminent lock-up is achievable by corresponding actuation of the servomotors 3, 4. To this end, the information from the wheel sensors 20, 21 relating to the rotational behavior of the wheels, namely on the deceleration and acceleration of the individual wheels and on momentary wheel slip, is processed by the microcomputer 22. In accordance with known anti-skid control algorithms and on the basis of this information, electric control signals are generated for the control elements 3, 4 as well as for the multi-directional valves 13, 14, 15, 16, 17 and 18.

The microcomputer upon recognizing a lock-up tendency prevents further pressure build-up upon further advance of the push rod 5 by signalling the control element 23, or the counteracting motor 4. The actuating force of the braking pressure generator 1, and thus the braking pressure, will be reduced due to retraction of the driving shaft 25 of the servomotor 3. By change-over of valve 13 or 14 it is possible to achieve a pressure reduction in either one of the two brake circuits I, II, while the pressure in the other locked and isolated brake circuit will remain constant. Also, by leaving the pressure medium path through the valves 13 and 14 open and actuating the individual-wheel valves 15, 16, 17 and 18, it is possible to keep the pressure constant in one wheel, only, or to reduce the pressure simultaneously in the wheel brakes of the two brake circuits I, II. For the purpose of providing renewed build-up, the auxiliary force generated by the control element 3 will be reincreased. Consequently, it will be possible to adjust the pressure in the individual wheels consecutively to the desired value in a similar known way. This type of braking pressure modulation which prevents a lock-up of the wheels and provides effective braking with a short stopping distance is referred to as time-division multiplexing control.

The brake system according to the invention can also be used for controlling traction slip by braking the wheel showing a tendency to spin. The information on the spinning tendency of the wheels will be sensed by the wheel sensors 20, 21 and will be supplied to the microcomputer 22. After locking the brake pedal 2, or the push rod 5, by means of the counteracting motor 4, an auxiliary force will be made available by means of actuation of the control element 3. The auxiliary force will effect a braking pressure in the brake circuits I, II by way of the lever 6 and the push rod 26 of the braking pressure generator 1. The pressure medium paths leading to the non-driven wheels will be locked by change-over of the corresponding wheel valves-in a front wheel drive vehicle the valves 17, 18 would be changed over. Braking pressure will be built up to the required level in the wheel brakes 9, 10 of the driven front wheels by means of metering-in of pressure fluid, for example by way of pulse-shaped actuation of the valves 15, 16. Thereupon, the braking pressure will be decreased again by way of the master cylinder 7. To this end, the auxiliary force generated by the control element 3 will have to be reduced first.

Figure 2:
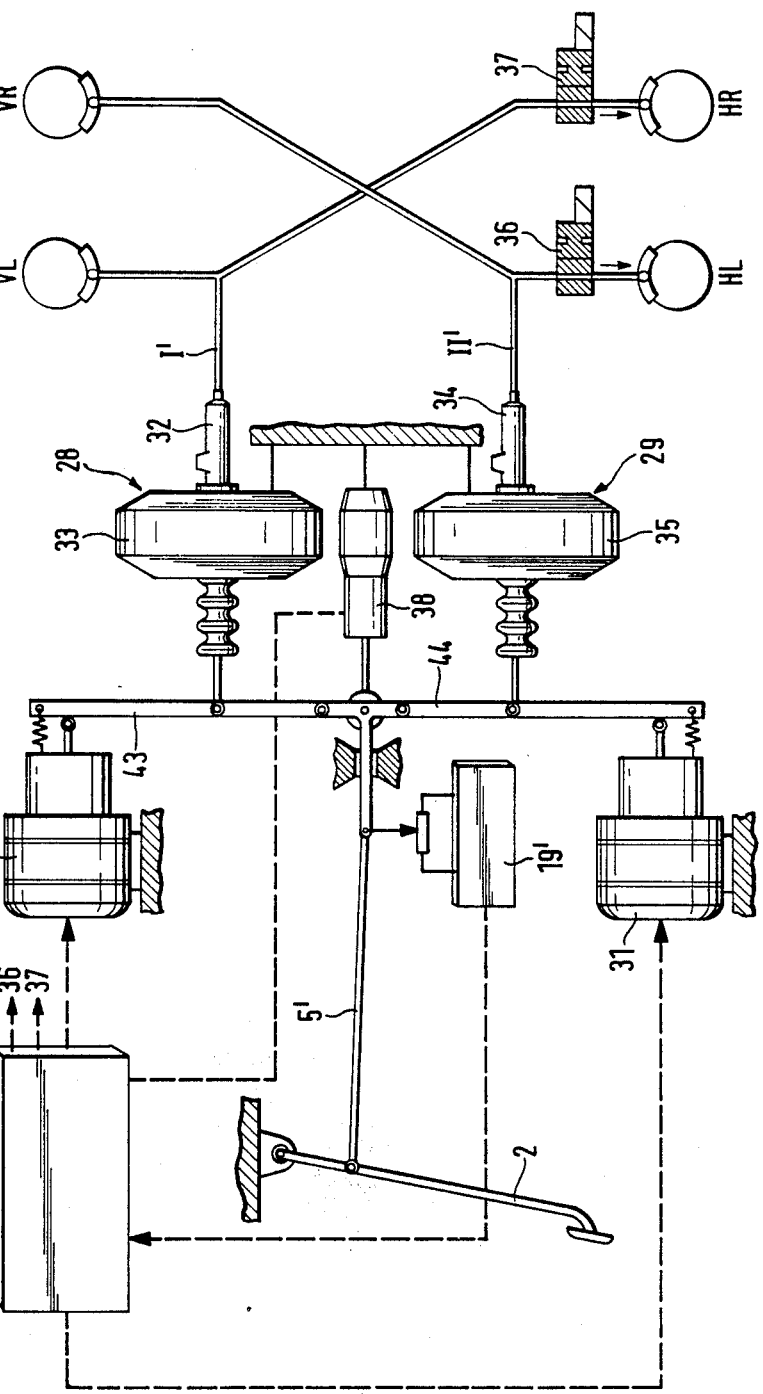
FIG. 2 is a block diagram of a dual circuit brake system of the invention having two master cylinders independent of each other wherein each is provided with a separate servomotor for generating an auxiliary force superimposed on the brake pedal; and, FIG. 3 is a block diagram of a brake system having a hydraulic or pneumatic servomotor for generating the auxiliary force superimposed on the pedal force.

The embodiment of the invention shown in FIG. 2 differs from the brake system of FIG. 1 in the different design of the braking pressure generator 28, 29 and the control elements 30, 31 by means of which the auxiliary force is generated for superimposition on the pedal force.

Seperate master cylinders 32, 34 are provided for each brake circuit I', II'. The cylinders are each provided with a vacuum booster 33, 35, respectively, which are connected upstream. The auxiliary force for assisting the pedal force is generated by way of separate control elements 30 and 31 and is transmitted to the braking pressure generators 28, 29 by separate levers 43, 44 which are hinged to the lever 5'. The braking pressure variation in the two brake circuits I', II' thus can be varied individually by a corresponding actuation of the control elements 30, 31. Fewer multi-directional valves 36, 37 are required in order to acheive the same braking pressure distribution as in the embodiment of FIG. 1. For traction slip control, the pressure medium paths leading to the non-driven rear wheels HL, HR are locked and isolated by means of the valves 36, 37.

For supporting or resetting the brake pedal 2, in the arrangement of FIG. 2, one control element 38 is sufficient. The travel measuring device 19' is the same as that shown in FIG. 1.

A further advantage of such a "duo version" using two homogeneous braking pressure generators 28, 29 is that the individual servomotors only have to be rated for a portion of the load.

Figure 3:
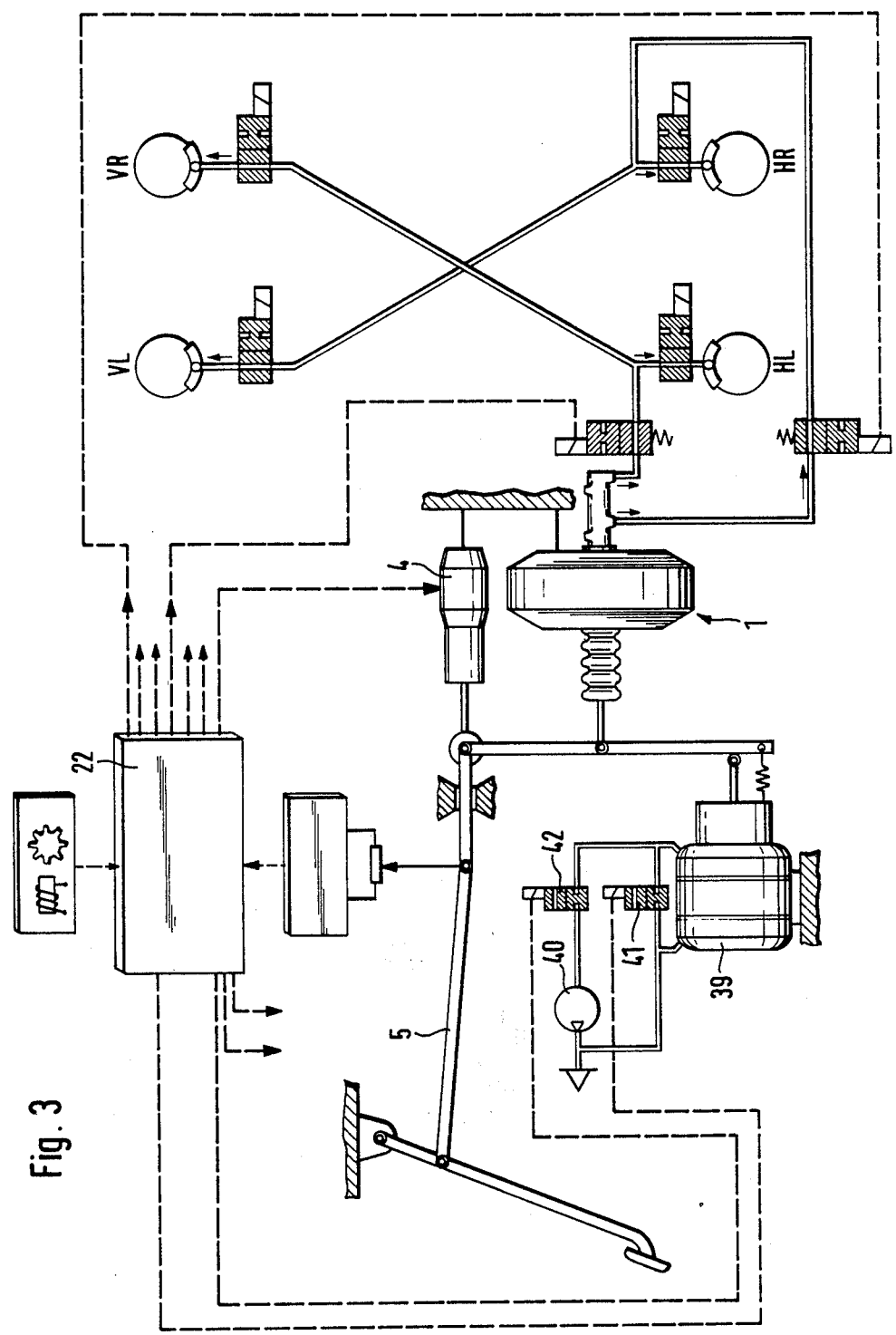

The embodiment of FIG. 3 illustrates a system that, instead of using a linear motor for generating the auxiliary force for assisting the pedal force, uses a control element 39 which receives its auxiliary energy from a pressure source or a vacuum source. Two multi-directional valves 41, 42 are provided for control and modulation of the auxiliary force generated by the control element 39 in addition to the auxiliary energy source 40. The multi-directional valves 41, 42 electromagnetically change-over, 2/2-way valves which allow a pressure difference in the two chambers of the control element 39 to be effected so as to bring about a pressure compensation. The control element 39 is preferably operated by a vacuum, and its design and operation is compatible with any known vacuum servo system which is also connected upstream of the master cylinders 7, 32, 34.

What is claimed is:

1. A brake system with at least one of anti-skid control and traction slip control, comprising a pedal operated braking pressure generator, auxiliary-force-generating means for producing controllable auxiliary forces to alternatively assist a pedal force and oppose said pedal force, wheel sensors for detecting rotational behavior of the wheels, electronic circuit means connected to said wheel sensors for generating auxiliary force control signals, said auxiliary-force-generating means being operatively connected between the brake pedal and the braking pressure generator, said controllable auxiliary forces being controllable in dependence on at least one of the brake pedal travel, the rotational behavior of the wheels and on a predetermined control pattern in said electronic circuit means, said auxiliary-force generating means comprising at least one servomotor operable to assist the brake actuating force imposed on the braking pressure generator by the brake pedal and a counteracting motor operable to limit brake pedal travel and thereby resist the brake pedal actuating force imposed on the braking pressure generator by the brake pedal, said servomotor and said counteracting motor being connected to the braking pressure generator and to the brake pedal by a common linearly displaceable compression tensioning element.

2. The brake system as claimed in claim 1 wherein said at least one servomotor and said counteracting motor are electrically controlled.

3. The brake system as claimed in claim 2 wherein at least one master cylinder and at least one vacuum booster define said braking pressure generator.

4. The brake system as claimed in claim 3 wherein said system includes two hydraulically separate brake circuits, one master cylinder and one vaccuum booster provided for each brake circuit and two control elements each connected to a separate one of said servomotors for assisting the pedal force.

5. The brake system as claimed in claim 4 including at least two electronically controllable multi-directional valves, at least one valve provided in each brake circuit leading from the braking pressure generator to the wheel brakes, said valves coupled to said electronic circuit means for passage of fluid in a normal position of said valve, each valve operable to isolate said wheel brakes from said braking pressure generator.

6. The brake system as claimed in claim 4 wherein said electronic circuit means includes a microcomputer coupled to the wheel sensors, to multidirectional valves and to a travel measuring device, said travel measuring device being coupled to said pedal for ascertaining pedal travel, wheel slip of said vehicle being controllable by direct or indirect control by a least one of the control elements and of the multidirectional valves by said microcomputer.

7. The brake system as claimed in claim 1 wherein two of said servomotors define control elements of said auxiliary force generating means.

8. The brake system as claimed in claim 7 wherein the control elements are connected to said linearly displaceable tension compression element being connected to said pedal, said auxiliary force being superimposable on the pedal force through said compression tensioning element 9. The brake system as claimed in claim 8 wherein two electric linear motors define said servomotors, said motors operatively connected to the pedal and to the braking pressure generator by said linearly displaceable compression tensioning element 10. The brake system as claimed in claim 7 wherein said counteracting motor is further operable to reset the brake pedal.

11. The brake system as claimed in claim 10 wherein said system includes two hydraulically separate brake circuits each circuit provided with a master cylinder of its own, one control element operatively connected to one master cylinder, a second control element operatively connected to the second master cylinder and defining a common control element connected to said counteracting motor

* * * * *